May 5, 1959  A. U. BRYANT  2,885,176
VALVE CONSTRUCTION
Filed Feb. 24, 1953  3 Sheets-Sheet 1
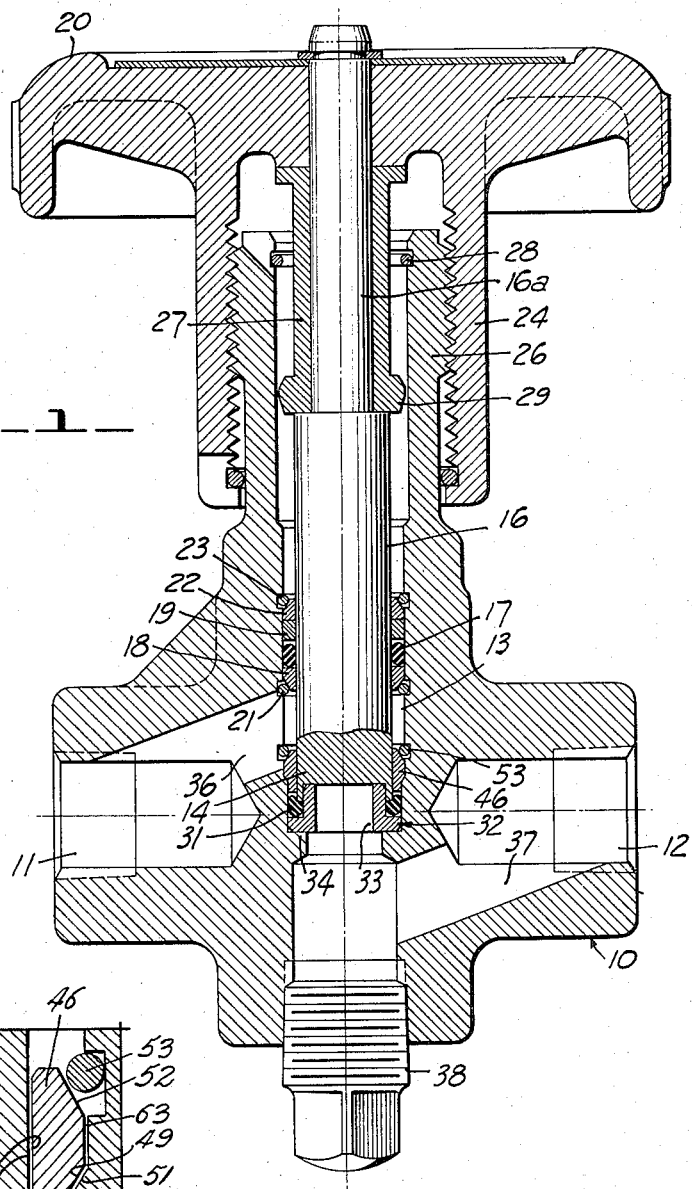
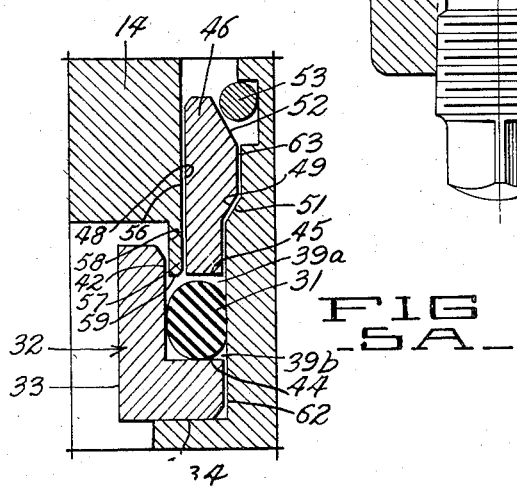
INVENTOR.
Austin U. Bryant
BY
ATTORNEYS May 5, 1959
A. U. BRYANT
2,885,176
VALVE CONSTRUCTION
Filed Feb. 24, 1953
3 Sheets-Sheet 2
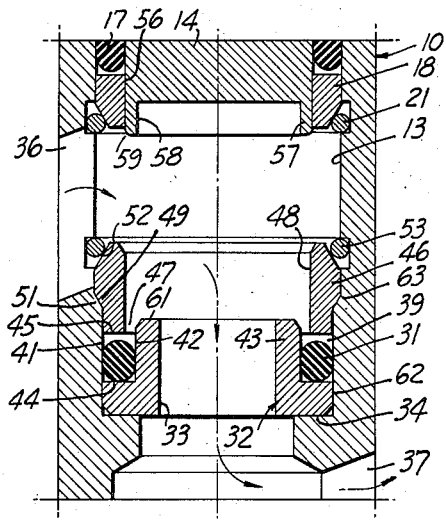
FIG_2_
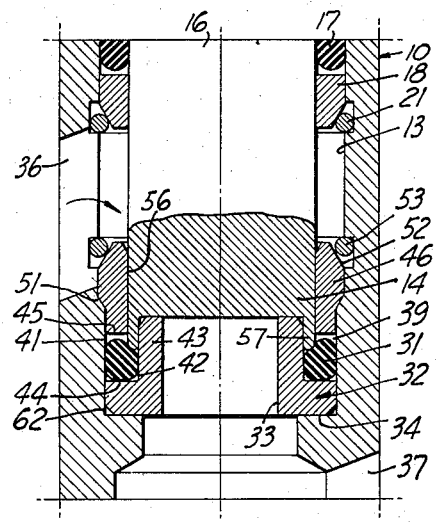
FIG_3_
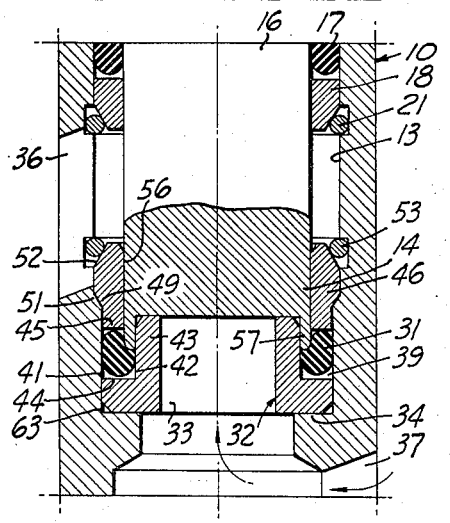
FIG_4_
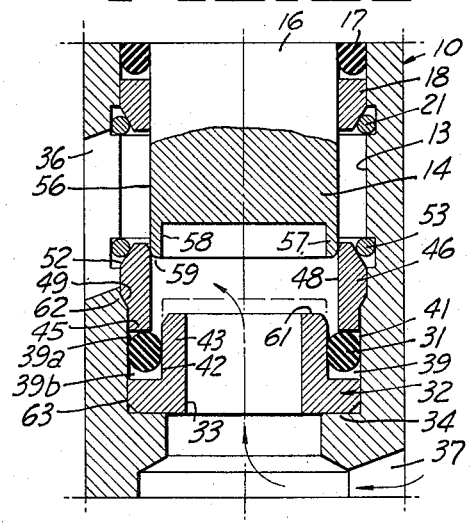
FIG_5_
INVENTOR.
Austin U. Bryant
BY
ATTORNEYS

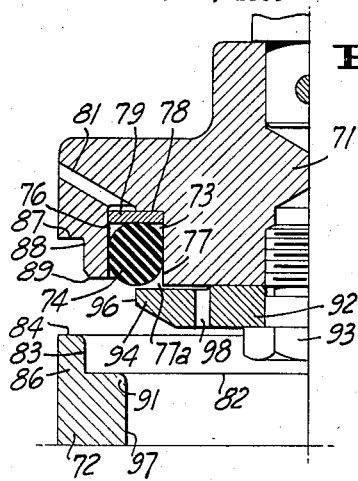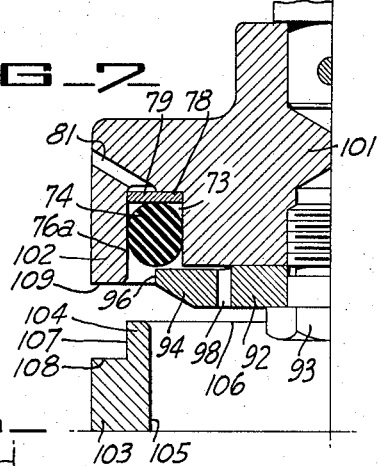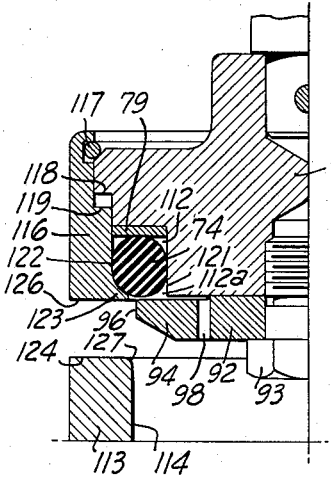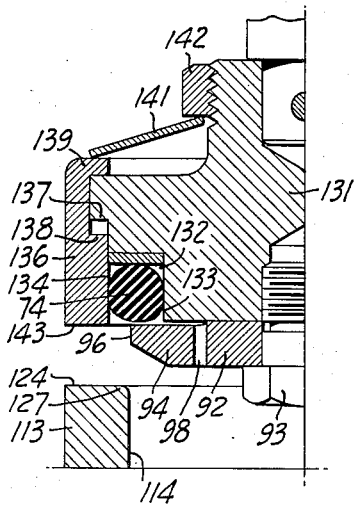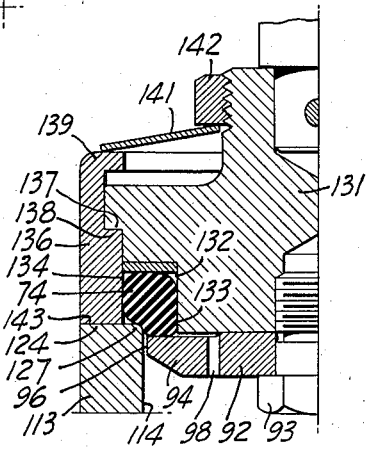

United States Patent Office 2,885,176
Patented May 5, 1959

2,885,176

VALVE CONSTRUCTION

Austin U. Bryant, Walnut Creek, Calif., assignor, by mesne assignments, to Walworth Company, New York, N.Y., a corporation of Massachusetts Application February 24, 1953, Serial No. 338,287

7 Claims. (Cl. 251—172)

This invention relates generally to valves for controlling fluid flow. It is applicable to valves suitable for manual operation, as well as to valves operated by various types of motor devices.

In my co-pending application Serial No. 3,728, filed January 22, 1948, now Patent 2,713,989 I have disclosed a valve making use of sealing means of the resilient O-ring type which is suitable for use on relatively high fluid pressures, as for example differential pressures which may range from 1,000 to 3,000 p.s.i. or higher. Such valves are particularly advantageous because they provide bubble tight shut-off when in closed position without applying relatively high mechanical forces between the valve working parts.

The present invention makes use of sealing means of the resilient O-ring type, and provides a construction which can be advantageously incorporated in a valve of the globe type, in which the valve member moves toward and away from a cooperating stationary seat to control fluid flow.

Another object of the invention is to provide a valve of the above character which can be used for application of high pressure from either direction, with maintenance of a bubble tight seal in closed position, and without dislodgment of the resilient O-ring when the valve member is moved between closed and open positions.

Additional objects of the invention will appear from the following description in which the preferred embodiments have been set forth in detail in conjunction with the accompanying drawing.

Referring to the drawing:

Figure 1 is a side elevational view in cross-section of a valve incorporating the present invention, and adapted for flow in either direction.

Figure 2 is an enlarged cross-sectional detail of a portion of Figure 1 showing the valve in full open position.

Figure 3 is a cross-sectional detail like Figure 2 but showing the valve parts in closed position, and with pressure being applied to the upper side of the seal ring.

Figure 4 is a cross-sectional detail like Figure 3 but showing application of pressure to the lower side of the seal ring.

Figure 5 is a cross-sectional detail like Figure 2 showing the valve parts in partially open position, with pressure being applied to the lower one of the valve passages.

Figure 5A is a detail in section with dimensions distorted to illustrate certain clearances between the parts.

Figure 6 is a cross-sectional detail illustrating another embodiment of the invention in which the seal ring is carried by the movable valve part.

Figure 7 is a cross-sectional detail illustrating a modification of Figure 6.

Figure 8 is a half-sectional detail illustrating another embodiment of the invention.

Figure 9 is a half-sectional detail illustrating a further embodiment of the invention.

Figure 10 is a cross-sectional detail like Figure 9 but showing the parts in full closed position.

The embodiment of the invention illustrated in Figure 1 consists of a valve body 10, which is provided with the flow passages 11 and 12. The passages are threaded or otherwise formed to facilitate making connection with associated piping. The body is formed to provide a bore 13 extending transversely to passages 11 and 12 and serving to accommodate the valve member 14. The valve member can be formed upon the inner end of the rod or plunger 16, which has an exterior end portion or stem 16a of reduced diameter for cooperative connection with the hand wheel 20 or other operating means. While conventional packing means can be used to seal between the rod 16 and the body, it is preferable to provide the sealing means illustrated which makes use of resilient seal ring 17 of the O-ring type. This ring is loosely disposed between the rings 18 and 19. Ring 18 is seated on a shoulder formed by the snap-in ring 21, and the resilient back-up ring 19 is retained by the adjacent ring 22, the latter being engaged by the snap-in ring 23.

Conventional operating means can be employed to move the valve member in opposite directions responsive to rotation of the hand wheel. In the construction illustrated the hand wheel is provided with an internally threaded sleeve extension 24, which is threaded on the body extension 26. The hand wheel is journaled upon the outer end of the stem 16a and is held against axial movement relative to the stem by the spacer sleeve 27. A snap-in ring 28, carried by the body extension 26, forms a safety stop which may engage the enlarged end portion 29 of the spacer sleeve 27.

The valve sealing means which functions between the movable valve member 14 and the body, makes use of the resilient seal ring 31 of the O-ring type. Associated with the seal ring (Figure 1) there is a seat ring 32 which has a valve throat opening 33 through the same, and which is seated upon a shoulder 34, formed within the body. Above the ring 31 the bore 13 is in communication with the passage 11 through the connecting port or passage 36. Similarly the space below the ring 32 is in free communication with passage 12 through the port or passage 37. A closure plug 38 can be applied to one end of the body, and if desired can be removed to form a passage for use with or in place of the passage 12.

The parts which cooperate with the resilient O-ring 31 can be best understood by reference to Figure 2. The O-ring is retained within an annular groove or recess 39 which is defined by the cylindrical bore surface 41, the cylindrical surface 42 formed on a portion 43 of the seat ring 32, a bottom recess surface 44, and a surface 45 which constitutes the end of the ring 46. Surfaces 41 and 42 are spaced apart a radial distance which is slightly less than the uncompressed radial width of the O-ring. Therefore the O-ring is normally squeezed a slight amount between these surfaces, as indicated in Figure 2. Surfaces 44 and 45 are spaced apart a distance somewhat greater than the normal diameter of the O-ring cross-section, and therefore a clearance exists at all times between either one or both of these surfaces and the adjacent surfaces of the O-ring. The surface 45 overlies a portion but not all of the O-ring thus providing an annular space 47 between the surfaces 48 and 42.

The ring 46 is held in fixed position within the body by suitable means which preferably permits the ring to be removed for replacement of the O-ring. Thus the ring is shown provided with a shoulder 49 which seats upon the cooperating shoulder 51 on the valve body, and its one end portion is beveled as indicated at 52, and engaged by the snap-in ring 53. The bore through the ring 46 provides the cylindrical surface 48 which is slightly greater in diameter than the diameter of the valve member 14.

The valve member 14 is formed to provide a cylindrical exterior surface 56, which is of a diameter slightly less than the diameter of the inner surface 48. A depending rib or lip 57 is also formed on the valve member, and the inner cylindrical surface 58 of this lip is on a diameter slightly greater than the diameter of the surface 42. The lip 57 enters the annular space 47, as the valve moves to closed position. The peripheral edge or corner can be beveled or rounded to contact the O-ring. Preferably the depth of the lip 57 is substantially greater than the distance between surface 45 and the opposed surface of the O-ring, when the O-ring is in contact with the surface 44, as illustrated in Figure 2. Thus under all pressure conditions the lip 57 is brought into sealing contact with the O-ring. The portion 43 of member 32 preferably extends in overlapping relation with a portion of the ring 46. Thus as illustrated in Figure 2, the upper end face 61 of portion 43 is spaced axially from the surface 45 by a distance which roughly approximates one half the depth of the lip 57.

The dimensions of the parts are such that clearances are provided between surfaces 56 and 48 (Figure 5A), and between the inner and outer peripheries of lip 57 and surfaces 42 and 48. Also clearances 62 and 63 are provided between ring 32 and the body, and between ring 46 and the body. Clearance 62 communicates with body passage 37 by virtue of its unsealed contact of ring 32 with shoulder 34. The clearances just described can be referred to as pressure communicating ducts.

Operation of the valve described above is as follows: For full open position of the valve member shown in Figure 2, flow may freely occur through the valve in either direction. Such flow cannot create differential pressures upon the O-ring sufficient to dislodge it from the recess 39. For the full closed position shown in Figure 3, the valve member 14 is in direct metal-to-metal contact with the ring 32 and the corner 59 of the lip 57 is in sealing engagement with the resilient O-ring 31. When a differential fluid pressure is applied to the upper side of the O-ring, the pressure is transmitted to an upper area of the ring through clearance 63, and the clearance between surfaces 48 and 56. The O-ring is urged against the bottom surface 44, and maintains sealing engagement with respect to surfaces 41 and 42 and also with respect to the corner 59. Thus a bubble tight seal is established between the valve member and the body. When a differential pressure is applied in a reverse direction, that is against the lower side of the O-ring through clearance 62, the O-ring is urged upwardly to the position illustrated in Figure 4. The O-ring remains in sealing contact with the surfaces 41 and 42, and it is pressed against the surface 45 by fluid pressure. Sealing contact is also maintained with respect to the corner 59 of the lip 57.

For the partly open position illustrated in dotted lines in Figure 5, the lower portion of the lip 57 occupies the annular space 47, and therefore any flow through the valve must occur both through the flow restricting clearance between this lip and the surface 42, and the flow restricting clearance between the lip and surface 56. Assuming that differential pressure is applied to the lower side of the O-ring as indicated by the arrows in Figure 5, the O-ring is pressed against the surface 45, and fluid forces are applied to the O-ring tending to urge it into the recess corner 39a. This is because the corner 39a is in pressure communication with the low pressure side of the valve, through the clearance 63 which exists between the ring 46 and the body. Thus fluid forces acting upon the O-ring under the conditions just outlined, tend to hold the O-ring in the recess, rather than to urge the O-ring in such a direction as to cause it to extrude through the annular space 47.

If while the valve is in the dotted line position shown in Figure 5, a differential fluid pressure is applied to the lower side of the same, it is pressed upwardly upon the surface 45, and continues to maintain a seal between the lip 57 and the body. When the valve member is raised from the position shown in dotted lines in Figure 5 to the position shown in solid lines in this figure, with fluid pressure being applied to the lower side of the same, the corner 59 of the lip 57 is freed from sealing contact with the resilient O-ring, without tendency for the O-ring to be extruded through the space 47, but flow is restricted because it must all pass through the clearance between surfaces 48 and 56. Also because of the loose fit between the member 46 and the body, the clearance 62 (Figure 5A) between these parts serves to connect the recess corner 39a to the lower side of the valve. Therefore under such conditions, fluid forces acting upon the O-ring tend to urge it into the recess corner 39a.

Assuming that the valve has been closed with pressure applied to its upper side (Figure 3) and the valve member is moved to about the position shown in dotted lines in Figure 5, to commence to separate the corner 59 from sealing contact with the O-ring. Under such conditions restricted line flow occurs through the clearance between surfaces 48 and 56 (Figure 5A) and also between surfaces 42 and 58. Because the recess corner 39b is in pressure equalizing communication with the low pressure side of the valve, through the clearance 63 formed between the ring 46 and the body, the O-ring under such conditions is urged towards the recess corner 39b and is not urged in such a manner as to tend to cause it to extrude through the passage 47, or to cling against the corner 59. After the valve member has been raised sufficiently far to clear the member 32, as for example to the position shown in solid lines in Figure 5, flow is restricted to what may occur between the surfaces 48 and 56. Further opening movement removes all restriction for flow in either direction.

It may be explained that as the valve member is moved from full closed toward open position, the critical point with respect to possible dislodgement of the O-ring from its retaining recess, is when the corner 59 is being separated from sealing contact with the O-ring. This is true irrespective of the direction of flow. At this critical point in movement of the valve member, and until the lip rest 57, has been retracted from the annular space 47, the flow restrictions formed by the clearances between lip 57 and surface 48, and between lip 57 and surface 42, serve to serially connect the two sides of the valve for restricted flow of line fluid.

The valve described above provides an absolute bubble tight seal for closed position, and which can be opened without dislodgment of the O-ring irrespective of the direction in which a fluid pressure differential is applied. No excessive force is required to urge the valve upon its seat, as in globe valves having metal-to-metal valve working surfaces. The valve can be used on relatively high operating pressures, as for example pressures of the order of 1,000 to 3,000 p.s.i., without causing dislodgement of the O-ring.

The O-ring can be made of various materials in accordance with service requirements. For many services a synthetic rubber of the Hycar type is satisfactory. However, I can use other synthetic rubbers like Neoprene, or materials like nylon or Teflon.

Figures 6 and 7 illustrate another embodiment of the invention in which the O-ring is carried by the movable valve member. The valve member 71 in this instance cooperates with the stationary seat ring 72. The seat ring can be either an integral part of the body, or may be secured to the body by a sealed rigid connection. An annular recess 73 serves to accommodate the resilient O-ring 74. The recess is defined by the radially spaced cylindrical surfaces 76 and 77 and the bottom surface 78. A loosely fitted washer 79 is disposed within the bottom of the recess and the bottom of the recess is vented to one side of the valve by one or more ducts 81. The spacing between surfaces 76 and 77 is slightly less than the uncompressed width of the O-ring, whereby the O-ring is normally compressed in a radial direction.

The seat ring 72 is formed to provide the flat shoulder surface 82, the cylindrical surface 83, and the end face 84. Surfaces 83 and 84 are formed on the projecting lip 86. The valve member is formed to provide the surface 87, which is adapted to seat upon the surface 84, a cylindrical surface 88 which is slightly smaller in diameter than the cylindrical surface 83, and a surface 89 which is adapted to contact the surface 82. The inner corner 91 of the surface 82 is adapted to engage and form a seal with respect to the O-ring. An annular O-ring retaining member 92 is secured to the valve member by suitable means, such as the screw 93. This member provides an annular flange portion 94 which projects a substantial radial distance over the recess 73 and the O-ring. The outer peripheral surface 96 of the flange 94 is formed on a diameter slightly less than the diameter of the cylindrical surface 97, formed on the seat ring 72.

The O-ring accommodating recess corner 77a, which is adjacent the flange portion 92, is in pressure equalizing communication with one side of the valve through one or more ducts 98.

Operation of the valve shown in Figure 6 is generally the same as the valve shown in Figures 1 to 5 inclusive. When the valve member 71 is seated upon the ring 72, the seat corner 91 is pressed into sealing engagement with the O-ring 74, and the O-ring establishes a bubble-tight seal between the valve member and the valve body, for differential fluid pressures applied to either side of the same. As the valve member is moved from full closed towards open position, it passes through a critical point where the corner 91 separates from sealing contact with the O-ring. At this time two flow restrictions are formed, one on the high pressure side, and the other on the low pressure side of the O-ring. The effect of these restrictions, together with the fact that either the recess corner 77a or the bottom of the recess 73 (depending upon the direction of pressure application) establishes pressure equalizing communication with the low pressure side, causing pressure forces to be applied to the O-ring tending to hold it within its recess, rather than to cause it to be extruded through the space provided immediately beyond the outer periphery of the flange portion 94.

In the embodiment of Figure 7, the valve member 101 is similar to the member 71 of Figure 6, particularly in that the O-ring 74 is accommodated within the recess 73, and is retained by the flange portion 94 of the member 92. However, in this instance the outer annular portion 102 of the valve member is extended to embrace the flange portion 94. The seat member 103 is formed to provide the extended lip 104. The seat also provides the inner cylindrical surface 105 which is slightly greater in diameter than the diameter of the surface 96, a beveled or rounded corner 106 which is adapted to engage and seal upon the O-ring, a cylindrical surface 107 which is slightly smaller in diameter than the cylindrical recess surface 76a, and shoulder surface 108 which is adapted to contact the opposing end surface 109 of the valve member.

It will be evident that with the arrangement of Figure 7 the lip 104 enters the annular space between the surfaces 76a and 96 when the valve member is moved to full closed position. For closed position the corner 106 is pressed into sealing contact with the O-ring and the O-ring thus establishes a bubble tight seal between the valve member and the valve body. As the valve member is moved toward open position, a critical point is reached when the corner 106 starts to separate from sealing contact with the O-ring. At this point, and while the lip 105 remains within the annular space between surfaces 76a and 96, flow restrictions are formed on both sides of the O-ring in the same manner as described with respect to Figure 6. Here again the fluid forces, exerted through the ducts 81 and 98 and acting upon the O-ring, tend to hold the O-ring within its accommodating recess, rather than to cause the same to be dislodged, and this effect is secured irrespective of the direction to which a pressure is applied.

In the embodiment of Figure 8 the O-ring is retained by a movable member in addition to the member 92. In this instance the valve member 111 is provided with a recess 112 for accommodating the O-ring 74, and also with the retaining member 92. The seat ring 113 is of simplified construction, having a cylindrical surface 114 which is on a diameter slightly larger than the diameter of surface 96. An annular guard member 116 is slidably fitted upon the valve member 111, and is movable axially between limiting positions defined by the snap-in ring 117, and the opposed shoulders 118 and 119. The O-ring accommodating recess 112 is defined in this instance by the cylindrical surface 121, formed on the body of the valve member and the surface 122, formed on the inner periphery of member 116. The O-ring is normally squeezed in a radial direction, the same as in Figures 6 and 7. The one extremity of member 116 is provided with a lip 123, which underlies the O-ring, and which extends to a position in proximity with the flange portion 94. The end face 124 of the seat ring 113 is adapted to engage the end face 126 of member 116, when the valve is moved to closed position. For the final part of the closing movement, the member 116 is displaced with respect to the O-ring, while at the same time somewhat deforming the O-ring. For closed position of the valve, the seat ring corner 127 is brought into sealing engagement with the O-ring. When the valve member is moved from full closed position to an open position, the surfaces 124 and 126 remain in contact for the initial part of such movement due to the tendency of the O-ring to return to its original form. Thereafter the surfaces 124 and 126 separate as the valve member continues to move to full open position.

With the valve of Figure 8, the corner 112a of the recess 112 is again in pressure transmitting communication with one side of the valve through the duct 98. Likewise the bottom of the recess 112 is in pressure transmitting communication with the other side of the valve, through the clearance between the member 116 and the body of the valve member.

Figure 9 shows an arrangement somewhat similar to Figure 8, but in which a mechanical spring is utilized in conjunction with the O-ring retaining means. In this instance the valve member 131 is provided with the O-ring accommodating recess 132, and with a retaining member 92, the same as in Figures 6 to 8. The O-ring 74 normally is compressed between the radially spaced cylindrical surfaces 133 and 134, the latter being formed on the guard member 136. The guard member is slidably fitted upon the body of the valve member, and may move in an axial direction between limiting positions defined by the shoulders 137 and 138, and the flange 139. A dished spring metal washer 141 engages the flange 139, and also a nut 142 which is threaded to the body of the valve member. The valve seat 113 is the same as in Figure 8, and surface 124 of this seat is adapted to contact the end face 143 of the member 136.

Operation of the embodiment shown in Figure 9 is substantially the same as that shown in Figure 8. When the valve member is moved to full closed position, the washer 141 is sprung by the final part of the closing movement. Closed position of the valve is illustrated in Figure 10. Movement of the member 136 relative to the body of the valve member exposes the O-ring to a sufficient extent to enable it to establish sealing contact with the corner 127 of the seat ring. When the valve is moved to full open position the initial part of such movement takes place with the surfaces 124 and 143 remaining in contact, whereby member 136 returns to O-ring embracing position, before any substantial flow is permitted through the valve.

This application is a continuation-in-part of co-pending application Serial No. 283,555, filed April 22, 1952, since abandoned and entitled "Valve Construction."

I claim:

1. In a valve for controlling fluid flow, a body having fluid flow passages, a valve member movable within the body in opposite directions between closed and open positions, a resilient O-ring, means carried by the body for mounting the O-ring thereon, said mounting means forming an O-ring accommodating recess defined by radially spaced inner and outer substantially cylindrical surfaces, a bottom surface on that side of the O-ring which is remote from the valve member, and a top surface on that side of the O-ring which is faced toward the valve member, said last surface terminating short of the inner cylindrical surface to provide an annular space therebetween, the radial spacing between said outer and inner cylindrical surfaces being slightly less than the radial thickness of the O-ring whereby the O-ring is normally squeezed between said surfaces to establish fluid tight engagement therewith, the passages being connected through said mounting for open position of the valve member, and ducts serving to establish pressure equalizing communication between regions in said recess adjacent said bottom and top surfaces and the flow passages on corresponding opposite sides of the valve member for closed position of the same, the valve member having a substantially cylindrical shaped lip extending therefrom and in a general direction toward the O-ring, said lip being proportioned to enter and retract from said annular space upon moving the valve member between closed and open positions of the same, a corner of said lip engaging with said O-ring to form a fluid tight seal for full closed position.

2. A valve as in claim 1 in which the valve member and the lip provide a cylindrical surface on the valve member and in which said top surface is formed on one end of an annular member carried by the body, said annular member providing an inner peripheral surface of a diameter slightly greater than the diameter of the peripheral surface of the valve member, the valve member being movable to retract the same from said annular member for full open position of the valve.

3. A valve as in claim 2 in which the inner cylindrical surface of said O-ring mounting means is extended axially in overlapping relation with the inner peripheral surface of said annular member, the lip on the valve member being dimensioned to extend between said surfaces into said annular recess for full closed position of the valve.

4. A valve as in claim 1 in which said bottom and top surfaces are formed on annular members dimensioned to loosely fit within a bore formed in the body, and in which the clearances between the annular members of the body form said ducts.

5. In a valve for controlling fluid flow, a body having fluid flow passages and a valve seat member forming a throat orifice connecting said passages for open position of the valve, a valve member movable within the body toward and away from the valve seat between closed and open positions and in the direction of its axis, said members having opposed annular surfaces concentric with said axis and brought into direct abutment for closed position of the valve, an annular recess formed in one of said members and having an open side faced toward the other member, said recess being defined by concentric radially spaced inner and outer annular surfaces aligned with said axis and by a bottom surface remote from said open side, an O-ring of resilient material fitted within said recess, the cross-sectional configuration of said O-ring having a diameter substantially greater than the radial spacing between the inner and outer defining surfaces of said annular recess whereby said O-ring is compressed in a radial direction to establish seals between its inner and outer peripheries and the adjacent inner and outer defining surfaces of the recess, duct means serving to establish fluid pressure equalizing communication between the portion of the recess below said O-ring and that passage of the valve which is on the corresponding side of the valve member for closed position of the same, the other one of said members having an annular portion dimensioned for closed position of the valve to engage a portion of that surface of said O-ring which is faced toward the open side of the recess, and thereby establish sealed contact, with a part of the surface of said O-ring adjacent said sealed contact being exposed to fluid pressure in the other passage of the valve, said O-ring serving to establish a fluid tight seal between the valve members for closed valve position, and duct means for establishing fluid pressure communication between those regions of the recess immediately within and immediately surrounding said sealed contact with said annular portion, and the corresponding valve passages, said last-mentioned duct means being in restricted communication for line flow serially through the same when said sealed contact is broken as the valve is moved from closed toward open position.

6. A valve as in claim 5 in which the annular recess is formed in the valve seat.

7. A valve as in claim 5 in which the annular recess is formed in the valve member.

References Cited in the file of this patent

UNITED STATES PATENTS

| | | |
|---|---|---|
| 1,667,580 | Albrecht | Apr. 24, 1928 |
| 2,431,437 | Van Der Werff | Nov. 25, 1947 |
| 2,524,951 | Ashton | Oct. 10, 1950 |
| 2,574,054 | Miller | Nov. 6, 1951 |
| 2,574,851 | Wagner | Nov. 13, 1951 |
| 2,616,653 | Tarr | Nov. 4, 1952 |
| 2,621,011 | Smith | Dec. 9, 1952 |
| 2,624,542 | Ghormley | Jan. 6, 1953 |
| 2,676,782 | Bostock | Apr. 27, 1954 |
| 2,713,989 | Bryant | July 26, 1955 |